No. 820,419. PATENTED MAY 15, 1906.
F. W. HODGES.
FORCE FEED LUBRICATOR.
APPLICATION FILED MAR. 11, 1905
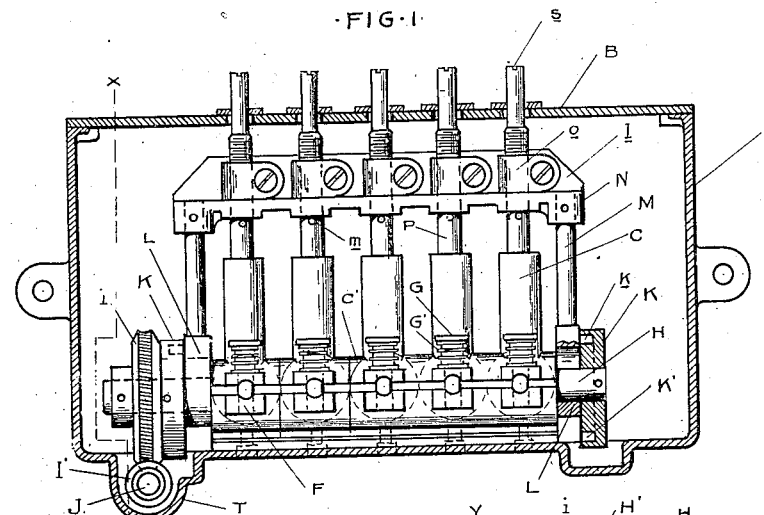
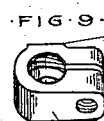
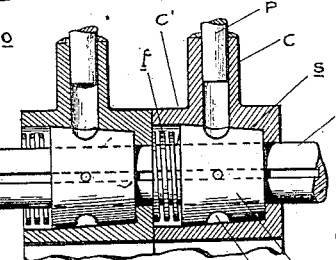
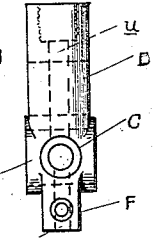
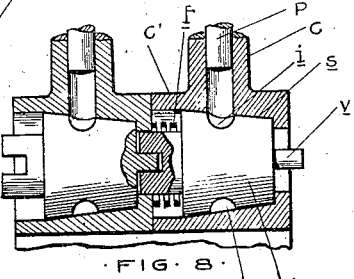
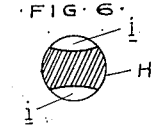
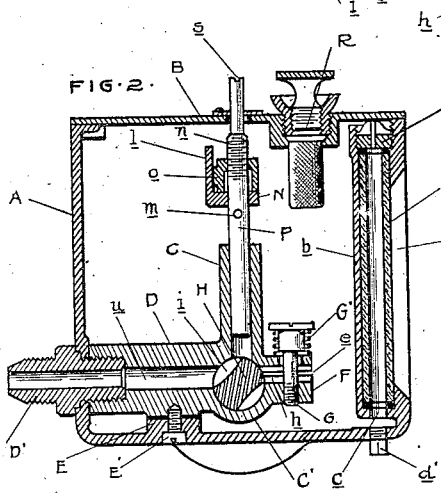
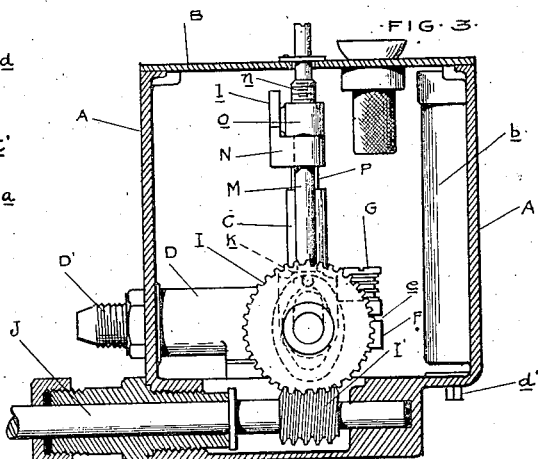
INVENTOR
FREDERICK W. HODGES

UNITED STATES PATENT OFFICE.

FREDERICK W. HODGES, OF DETROIT, MICHIGAN.

FORCE-FEED LUBRICATOR.

No. 820,419.　　　　　Specification of Letters Patent.　　　　Patented May 15, 1906.

Application filed March 11, 1905. Serial No. 249,591.

*To all whom it may concern:*

Be it known that I, FREDERICK W. HODGES, a citizen of the United States, residing at Detroit, in the county of Wayne and State of Michigan, have invented certain new and useful Improvements in Force-Feed Lubricators, of which the following is a specification, reference being had therein to the accompanying drawings.

The invention relates to force-feeding lubricating devices; and it consists in the construction of such device, which is simple in construction, easy to manufacture, repair, assemble, replace, and adjust, and, further, in the construction, arrangement, and combination of the various parts, as more fully hereinafter described, and particularly pointed out in the claims.

In the drawings, Figure 1 is a vertical central section through an oil-reservoir containing pumping mechanism embodying the invention, the pumping mechanism being shown in elevation except the cam at one end, which is shown in section. Fig. 2 is a vertical central cross-section therethrough. Fig. 3 is a vertical cross-section on the line $x\ x$, Fig. 1. Fig. 4 is a plan view of the pump and valve-casing detached. Fig. 5 is a plan of the valve-shaft and valves. Fig. 6 is a cross-section thereof on the line $y\ y$ of Fig. 5. Fig. 7 is a longitudinal section through a modified form of valve and valve-casing, partly showing the cylinder and piston of the pump. Fig. 8 is a similar section through a still different modification, and Fig. 9 is a perspective view of the adjusting-nut for the piston.

A is a casing forming within a reservoir for oil which it is intended to force to various points for lubrication or other purposes. The particular construction herein shown is designed especially for use in lubrication of automobiles; but it is obvious that my invention may be applied to other uses and lubrication of other devices with or without changes in detail.

One side wall of the casing is provided with a slit $a$, and cast or otherwise secured around this slit is the tubular casing $b$. This tubular casing is preferably cast with the lower end a slight distance above the bottom of the reservoir, and the bottom is provided with an aperture $c$. The top being open, a gage-glass $c'$ may be inserted therein, and this glass is held in position by means of a nut $d$, engaging screw-threads at the upper portion of the tubular casing $b$. This nut is preferably apertured, so as to permit the free passage of air therethrough in order that the oil may freely pass into the gage-glass to indicate the level of the oil in the reservoir. In the bottom of the reservoir and below the aperture $c$ is preferably formed an aperture closed by a plug $d'$. This aperture is formed so that the aperture $c$ may be bored and also forms a drain-opening for emptying the reservoir of oil and also enables the operator, if desired, to clean out the lower end of the tube or the passage beneath the casing $b$.

B is a top plate for the reservoir, secured thereto in any suitable manner.

In this particular construction I have shown the pumps and the valve mechanism entirely within the reservoir. I deem this a desirable arrangement; but it is obvious that, if desired, this pump and valve mechanism may be outside the reservoir and simply connected thereto by suitable passages. I have also shown a multiplicity of pumps; but it is obvious that the invention in certain of its features relates to the construction of a single pump.

Within the reservoir are a series of cylinders C. At the base of each cylinder is a valve-casing C'. Extending to one side from the valve-casing is the tubular body D, which forms the exit-pipe. This extends to the side wall of the reservoir and is secured thereto by a tubular nipple D', having a screw-threaded engagement with an interior screw-thread in the part D and provided with suitable means for attaching a pipe thereto outside the reservoir, so that the oil pumped into the exit-passage may be delivered to any desired point. On the bottom of the reservoir is a boss E, upon which the part D rests, and a screw E', passing through the lug on the bottom plate, engages a screw-threaded aperture in the part D, and thus holds the pump in position.

Upon the side opposite the exit-pipe I provide the split extension or nipple F and preferably form therein in addition to the slit $e$ an inlet-passage $h$. G is a screw engaging a screw-threaded aperture in the lower portion of the split nipple F and passing through an aperture in the upper portion thereof. Between the head of the screw G and the top of the upper member is a spring G' for drawing the two portions of the split nipple together with a spring-pressure, for a purpose hereinafter to be described.

I preferably form the cylinder with its valve-casing and its inlet and exit passages of a single casting, as shown, and each casting thus forms a complete and integral pump by itself in connection with the valve now to be described. The valve is a rotary valve and fits within the valve-casing C', which is cylindrical, as shown. In Figs. 2 and 5 I have shown the valve as formed by a shaft H, preferably having thereon the enlarged valve portion H', the diameter of this valve portion being the same as the opening through the valve-casing C'.

When the series of pumps are connected together, as shown in Fig. 1, with the passages through the valve-casing arranged in line, the shaft H may be slitted longitudinally therein, and opposite each cylinder I provide the shaft with one or more ports $i$. These ports I have shown as formed by sectors cut out of the shaft, and in this particular design I have shown two such ports circumferentially arranged around the valve portion of the shaft of each pump.

To the left-hand end of the shaft I have shown secured a worm-wheel I, with which meshes a worm I' on the transverse shaft J, Figs. 1 and 3. This shaft is driven from any suitable source of power. (Not shown.) At each end of the shaft I have also provided cams K, having cam-grooves K', in which cam-grooves engage pins $k$, formed on yokes L at the lower end of the connecting-rods M. The connecting-rods M at their upper ends are attached to the cross-head N, which forms a common actuating means for all the pistons P. On this cross-head is a vertical side flange $l$. The cross-head N is apertured to permit the passage therethrough of the pistons P. Below the cross-head the pistons are each provided with a stop-shoulder pin $m$, and above the cross-head they are provided with a screw-threaded portion $n$, engaged by an adjusting-nut $o$. This adjusting-nut is preferably a split nut, as shown in Fig. 9, with suitable screw for drawing the two parts together, and it is provided on one side with a squared face $r$, adapted to bear against the flange $l$, so as to prevent the rotation of the nut when the piston is rotated.

The pistons project through suitable apertures in the top plate B and are provided with any suitable means by which they may be rotated. I have shown a slot $s$, adapted to receive a screw-driver or other tool for such rotation. The rotation of the piston will increase or diminish the space between the pin $m$ and the nut $o$, so that there may be more or less lost motion of the cross-head in its vertical reciprocation, and thus as each pump-piston may be separately adjusted the separate pumps may be adjusted for different amounts of throw, and hence different capacities, notwithstanding the fact that the cross-head N is actuated a uniform distance at each reciprocation for all the pumps.

R is a suitable fill-opening for the reservoir.

The parts being thus constructed their operation is as follows: The shaft J being rotated through the worm I' and the worm-wheel, I the valve-shaft H will be rotated and likewise the valve portion H' thereof. The cams K being secured to the valve-shaft will likewise rotate, and by means of the cam-ways $k'$ and the connecting-rods M the cross-head N will be vertically reciprocated, and the pistons of the pump will be correspondingly moved according to the adjustment of the piston and its fixed and adjustable stops.

In the rotation of the shaft the port $i$ will connect the inlet-passage $e$ with the cylinder C of the pump as the piston P ascends. As the piston reaches the top of its movement the inlet is shut off by the uncut portion of the valve-shaft and the port $i$ connects the cylinder with the discharge-passage $u$ through the discharge-nipple D, and it is so connected during the descending movement of the piston. By having a number of these ports around the shaft each acts as the inlet connection and the outlet connection to and from the cylinder successively. I have shown but two of these; but it is obvious that one alone may be used, or more than two, by simply arranging the proper cam in place of the cam K to correspondingly actuate the pistons, or it is obvious that by a suitable actuating device the valve-shaft may be only rocked, instead of being turned all the way around, to effect the same result.

It will be observed that this construction is extremely simple, for the reason that the shaft H acts not only as the drive-shaft for the pistons, but also forms all the valves for the pumps, and that by the use of such rotary valve all puppet or check valves are avoided.

By having the pistons project exteriorly of the reservoir the adjustments may be made for the various pistons, so that different amounts of oil may be pumped by the different pistons without taking off the cover of the reservoir.

I preferably arrange the shaft J in a trough T in the bottom of the reservoir, so that at all times the worm and worm-wheel will be properly supplied with oil.

Instead of providing a continuous shaft with the cut-away portions or parts formed directly therein I may form the valve-shaft as shown in Fig. 7, in which is shown a valve-casing with a tapering valve-seat $s$, in which a tapering valve $s'$ is sleeved on the shaft H with a key and keyway connection, and in this construction I preferably employ a spring $t$ for holding the valve tightly to its seat.

Instead of having a continuous shaft, such as H, pass entirely through I may simply connect up the valves to form a shaft, as shown in Fig. 6, in which the construction is similar to that shown in Fig. 7, except that one valve is provided with a recess in its end adapted to receive the squared lug or projection v. I understand that these or other modifications are clearly the equivalent of the construction shown in Fig. 5.

What I claim as my invention is—

1. In a lubricating device, the combination of an oil-reservoir, a pump therein, inlet and discharge pipes on opposite sides at the end of the pump-cylinder, and a double-ported rotary valve at the juncture of the cylinder, and the inlet and discharge passages, for the purpose described.

2. In a lubricating device, the combination of a pump, a rotary valve having a multiple of ports, each port adapted to successively connect the inlet-passage with the pump and the pump with the exit-passage.

3. In a lubricating device, a pump, a rotary valve for the pump having a multiple of circumferential ports, and means for rotating the valve to cause the ports to each successively act as the inlet-port and as the outlet-port for the pump.

4. In a lubricating device, the combination of a multiple of separate pump-casings, arranged side by side, having valve-casings with alined valve-seats, inlet and outlet passages leading to said valve-casings, a valve for each valve-casing, and a common actuating device for all the valves.

5. In a lubricating device, the combination of a multiple of separate casings, each having a cylinder, a valve-casing, and inlet and outlet passages, rotary valves in the valve-casings arranged in line, a common actuating device for all the valves, and pistons for the cylinders.

6. In a lubricating device, the combination of a multiple of cylinders, pistons therein, valve-casings on the cylinders having inlet and outlet ports, a shaft passing through all the casings and having ports for each cylinder, means for rotating the shaft and for reciprocating the pistons.

7. In a lubricating device, a series of pumps each comprising a cylinder-piston and a rotary controlling-valve, a common actuating device for all the pumps, and means for varying the pumping capacity of each pump separately.

8. The combination of a cylindrical valve-casing having an outlet-port, a rotary ported valve in the casing, a split extension forming the inlet-passage, means for compressing the two members of said extension to form a tight joint between the valve-casing and valve, a cylinder connecting to the valve-casing and the piston therein.

9. In a lubricating device, the combination of a series of cylinders, a rotary ported valve for each cylinder having inlet and outlet ports, a common actuating-head for all the pistons, means for adjusting the pistons to have different pumping capacity, and an actuating device for the head.

10. In a lubricating device, a reservoir, a pump therein, the piston of the pump projecting outside of the reservoir, and means in the interior of the reservoir for adjusting the piston to vary its throw said means being operated from the exterior.

11. In a lubricator, the combination of a series of pumps, a valve-shaft having a controlling-port for each pump, means for driving the shaft, and a drive connection from the shaft to the pumps.

In testimony whereof I affix my signature in presence of two witnesses.

FREDERICK W. HODGES.

Witnesses:
 AMELIA WILLIAMS,
 EDWARD D. AULT.